(No Model.)
W. H. KNIGHT.
ELECTRIC MOTOR.
No. 516,818. Patented Mar. 20, 1894.
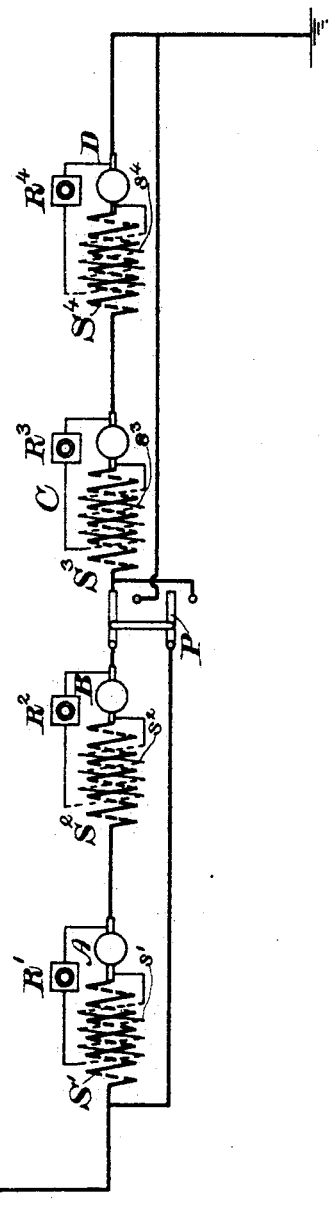
Witnesses—
A. F. Macdonald.
T. J. Johnston.
Inventor—
Walter H. Knight by
Bentley and Blodgett,
Attys.

United States Patent Office.

WALTER H. KNIGHT, OF LYNN, ASSIGNOR TO THE GENERAL ELECTRIC COMPANY, OF BOSTON, MASSACHUSETTS.

ELECTRIC MOTOR.

SPECIFICATION forming part of Letters Patent No. 516,818, dated March 20, 1894.

Application filed September 15, 1893. Serial No. 485,576. (No model.)

*To all whom it may concern:*

Be it known that I, WALTER H. KNIGHT, a citizen of the United States, residing at Lynn, in the county of Essex and State of Massachusetts, have invented a certain new and useful Improvement in Electric Motors, of which the following is a specification.

My invention relates to electric motors, particularly where employed in railway traction; and has for its object to provide a method and means of preventing or correcting a slip of the wheels and consequent racing of the motors, being particularly applicable to the case of electric locomotives where several motors are employed in series, with a series-parallel controller for throwing them into different combinations as now practiced in all heavy insulations.

When two or more motors are employed upon a locomotive, and the wheels to which one of them is geared start to slip, it is difficult to get sufficient traction, for two reasons: first, because the co-efficient of friction diminishes very rapidly as the speed increases, and second, because the speeding up of one motor acts to choke down the current delivered to the other motors so that their torque is very much diminished and they become inefficient to drive the locomotive although operating upon parts of the track which are not slippery. Suppose the slipping motor to be working at fifty ampères; the current must be checked by the rheostat or other current reducing means to about ten ampères before the slipping will cease, and this means that the motors which do not slip are also reduced to one-fifth of their former power.

It is to avoid the difficulties herein set out that I have devised my present invention, which consists in providing means whereby the racing of a motor will tend to demagnetize or weaken its own field without affecting that of the other motors, thus reducing its own power and at the same time reducing its resistance to the current from the mains, so that the other motors are not robbed. To this end I employ a differential shunt winding connected to the armature terminals of the motor, by which any excessive counter-electromotive force generated by the racing of its armature is carried around its field and tends to demagnetize it; while to prevent the demagnetizing shunt winding from constantly operating, I introduce in circuit with it a resistance which acts to prevent a sufficient flow of current from the mains to cause it to operate while the motor is running normally. I thus equalize the action of the motors by causing the acceleration of any armature to demagnetize its own field proportionately to the increase of speed over that of the others.

It has been proposed to construct an auxiliary shunt winding on one motor field in shunt with the armature of another motor, and while this is more or less effective, it is unduly complicated in the case of locomotives employing many motors, the practice of my invention being preferable.

In the accompanying drawing, hereby referred to and made part of this specification I show diagrammatically an embodiment of my invention as applied to four motors upon the same locomotive, or co-operating in the same work in any manner which renders my invention desirable. These motors are shown with a double-pole series-parallel switch, which may of course be replaced with a series-parallel controller of more improved pattern.

A, B, C, D are the motors, $S'$, $S^2$, $S^3$, $S^4$ are their series coils, connected in series in the case illustrated. $s'$, $s^2$, $s^3$, $s^4$ are the demagnetizing shunt-windings, which, as indicated diagrammatically, are wound in the opposite sense to the series coils and are connected to the terminals of the motor armatures respectively: there are but few turns comparatively in these windings.

$R'$, $R^2$, $R^3$, $R^4$ are resistances included in the circuit of the shunt windings and serving as already explained to limit the flow of the main current through them.

P is the double pole switch already referred to.

T is the trolley or other current supplying source.

The operation of the invention will be readily understood from the foregoing description.

Having thus described my invention, what I claim as new, and desire to secure by Letters Patent of the United States, is—

1. The method of equalizing the action of a number of motors connected in series co-operating in the same work which consists in causing the acceleration of one motor armature to demagnetize its own field proportionately to the increase of speed over the other armatures.

2. In a series wound electric motor, a differential shunt winding connected to its armature terminals adapted to respond to an increased speed of the armature.

3. In a series wound electric motor, a differential shunt winding connected to its armature terminals, and a resistance in such winding adapted to prevent the flow of the main current therethrough.

4. A plurality of electric motors adapted to be connected in series or parallel, each motor having series coils and a differential shunt winding adapted to be connected to its armature terminals to demagnetize its field when the motors are in series in accordance with the increased speed of its armature above that of other motors.

5. A plurality of electric motors connected in series and having series windings, and differential shunt windings each including a resistance and connected to the armature terminals; all arranged substantially as herein described to demagnetize the fields when the speed of the armature exceeds the normal speed for which they are designed.

In witness whereof I have hereunto set my hand this 13th day of September, 1893.

WALTER H. KNIGHT.

Witnesses:
JOHN W. GIBBONEY,
BENJAMIN B. HULL.